United States Patent
Stokking et al.

(10) Patent No.: US 11,523,185 B2
(45) Date of Patent: Dec. 6, 2022

(54) RENDERING VIDEO STREAM IN SUB-AREA OF VISIBLE DISPLAY AREA

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hans Maarten Stokking, Wateringen (NL); Alexandre da Silva Pratas Gabriel, The Hague (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 141 days.

(21) Appl. No.: 16/903,234

(22) Filed: Jun. 16, 2020

(65) Prior Publication Data
US 2020/0404375 A1 Dec. 24, 2020

(30) Foreign Application Priority Data
Jun. 19, 2019 (EP) .................... 19181221

(51) Int. Cl.
*H04N 21/462* (2011.01)
*G06T 19/00* (2011.01)
*H04N 21/435* (2011.01)

(52) U.S. Cl.
CPC ....... *H04N 21/4621* (2013.01); *G06T 19/006* (2013.01); *H04N 21/4356* (2013.01); *H04N 21/4358* (2013.01)

(58) Field of Classification Search
CPC .......... H04N 21/4621; H04N 21/4356; H04N 21/4358; H04N 21/2343; H04N 21/23439;
(Continued)

(56) References Cited

U.S. PATENT DOCUMENTS 7,894,531 B1  2/2011  Cetin et al.
9,210,200 B1  12/2015  Chapweske
(Continued)

FOREIGN PATENT DOCUMENTS

EP  1 555 634 A1  7/2005
EP  1672925  6/2006
(Continued)

OTHER PUBLICATIONS

"3rd Generation Partnership Project; Technical Specification Group Services and System Aspects: Study on Server And Network-assisted DASH (SAND) for 3GPP Multimedia Services (Release 14)," 3rd Generation Partnership Project, Sophia-Antipohs Cedex, France, 42 pages (2016).
(Continued)

*Primary Examiner* — Jeffery A Brier
(74) *Attorney, Agent, or Firm* — Hamilton, Brook, Smith & Reynolds, P.C.

(57) ABSTRACT

A system and method for rendering a video stream for display on a display device, which may comprise receiving the video stream by streaming and generating display data defining a visible display area to be displayed by the display device, wherein generating of display data comprises rendering the video stream in a sub-area of the visible display area. A selection mechanism may be provided by which a version of the video stream may be selected for streaming having a spatial resolution and/or a bitrate which is selected based on a size of the sub-area.

25 Claims, 8 Drawing Sheets

(58) Field of Classification Search
CPC ........... H04N 21/2662; H04N 21/6373; H04N 21/4728; G06T 19/006
See application file for complete search history.

(56) References Cited

U.S. PATENT DOCUMENTS

| | | | |
|---|---|---|---|
| 9,538,160 B1 | 1/2017 | Cole et al. | |
| 9,578,356 B1 | 2/2017 | Lin et al. | |
| 9,699,465 B2 | 7/2017 | Ouedraogo | |
| 9,749,627 B2 | 8/2017 | Wu | |
| 9,794,649 B2 | 10/2017 | Denoual et al. | |
| 9,860,572 B2 | 1/2018 | van Deventer et al. | |
| 9,883,011 B2 | 1/2018 | Denoual et al. | |
| 9,906,807 B2 | 2/2018 | Denoual et al. | |
| 10,182,241 B2 | 1/2019 | Li | |
| 10,200,721 B2 | 2/2019 | Denoual et al. | |
| 10,212,491 B2 | 2/2019 | Denoual et al. | |
| 10,257,247 B2 | 4/2019 | Denoual et al. | |
| 10,320,691 B1 | 6/2019 | Matthews | |
| 10,397,666 B2 | 8/2019 | Thomas | |
| 10,460,700 B1 | 10/2019 | Mendhekar | |
| 10,542,258 B2 | 1/2020 | Wang et al. | |
| 10,542,274 B2 | 1/2020 | Li | |
| 10,547,914 B2 | 1/2020 | Denoual et al. | |
| 10,674,185 B2 | 6/2020 | Thomas | |
| 11,119,719 B2 | 9/2021 | Prins et al. | |
| 2003/0020748 A1 | 1/2003 | Charpentier | |
| 2004/0071083 A1 | 4/2004 | Li et al. | |
| 2006/0120610 A1 | 6/2006 | Kong et al. | |
| 2006/0262345 A1 | 11/2006 | Le Leannec et al. | |
| 2007/0064689 A1 | 3/2007 | Shin et al. | |
| 2009/0300692 A1 | 12/2009 | Mavlankar et al. | |
| 2010/0074594 A1 | 3/2010 | Nakamura | |
| 2010/0135575 A1 | 6/2010 | Guo | |
| 2010/0232504 A1 | 9/2010 | Feng | |
| 2011/0096990 A1 | 4/2011 | Lu | |
| 2012/0017172 A1 | 1/2012 | Sheth et al. | |
| 2012/0131146 A1 | 5/2012 | Choi et al. | |
| 2012/0242781 A1 | 9/2012 | Gautier et al. | |
| 2013/0051768 A1 | 2/2013 | Soroushian | |
| 2013/0060911 A1 | 3/2013 | Nagaraj et al. | |
| 2013/0147836 A1 | 6/2013 | Small et al. | |
| 2013/0235270 A1 | 9/2013 | Sasaki | |
| 2014/0028798 A1 | 1/2014 | Tsukagoshi | |
| 2014/0063187 A1 | 3/2014 | Tsukagoshi | |
| 2014/0071236 A1 | 3/2014 | Tsukagoshi | |
| 2014/0079126 A1 | 3/2014 | Ye et al. | |
| 2014/0089500 A1 | 3/2014 | Sankar | |
| 2014/0089990 A1 | 3/2014 | van Deventer et al. | |
| 2014/0098185 A1 | 4/2014 | Davari | |
| 2014/0098186 A1 | 4/2014 | Seidl | |
| 2014/0125762 A1 | 5/2014 | Tsukagoshi | |
| 2014/0152834 A1 | 6/2014 | Kosseifi | |
| 2014/0300532 A1 | 10/2014 | Karkkainen et al. | |
| 2014/0341549 A1 | 11/2014 | Hattori | |
| 2015/0007224 A1 | 1/2015 | Cazoulat et al. | |
| 2015/0032901 A1 | 1/2015 | Wang et al. | |
| 2015/0095450 A1 | 4/2015 | Vitthaladevun | |
| 2015/0208103 A1 | 7/2015 | Guntur et al. | |
| 2015/0237166 A1 | 8/2015 | Denoual et al. | |
| 2015/0254882 A1 | 9/2015 | Englert | |
| 2015/0264404 A1 | 9/2015 | Hannuksela | |
| 2015/0302651 A1 | 10/2015 | Shpigelman | |
| 2015/0341412 A1* | 11/2015 | Marchand .......... H04N 21/8456 709/219 |
| 2015/0346812 A1 | 12/2015 | Cole et al. | |
| 2015/0346832 A1 | 12/2015 | Cole et al. | |
| 2015/0378157 A1 | 12/2015 | Kuehne et al. | |
| 2016/0006673 A1 | 1/2016 | Thomas | |
| 2016/0044095 A1 | 2/2016 | Sankar | |
| 2016/0094641 A1 | 3/2016 | Rahman | |
| 2016/0095043 A1 | 3/2016 | Maria | |
| 2016/0101356 A1 | 4/2016 | Kuo | |
| 2016/0104510 A1 | 4/2016 | Tamir | |
| 2016/0165309 A1 | 6/2016 | Van Brandenburg et al. | |
| 2016/0182927 A1 | 6/2016 | Denoual et al. | |
| 2016/0337206 A1 | 11/2016 | Bugenhagen | |
| 2016/0366454 A1* | 12/2016 | Tatourian .................. G06F 3/14 |
| 2016/0373546 A1 | 12/2016 | Lotfallah | |
| 2017/0013279 A1 | 1/2017 | Puri et al. | |
| 2017/0078447 A1 | 3/2017 | Hancock | |
| 2017/0085501 A1 | 3/2017 | Utgikar | |
| 2017/0118540 A1 | 4/2017 | Thomas et al. | |
| 2017/0155912 A1 | 6/2017 | Thomas et al. | |
| 2017/0180444 A1 | 6/2017 | Denoual et al. | |
| 2017/0223083 A1 | 8/2017 | Maze et al. | |
| 2017/0289219 A1 | 10/2017 | Khalid | |
| 2017/0318360 A1 | 11/2017 | Tran | |
| 2017/0339415 A1 | 11/2017 | Wang | |
| 2017/0347026 A1 | 11/2017 | Hannuksela | |
| 2017/0347163 A1 | 11/2017 | Wang | |
| 2017/0366605 A1 | 12/2017 | Chang | |
| 2018/0020204 A1 | 1/2018 | Pang | |
| 2018/0035134 A1 | 2/2018 | Pang | |
| 2018/0077210 A1 | 3/2018 | Hannuksela et al. | |
| 2018/0240276 A1 | 8/2018 | He | |
| 2018/0242028 A1 | 8/2018 | Van Brandenburg | |
| 2018/0295400 A1 | 10/2018 | Thomas | |
| 2018/0350146 A1 | 12/2018 | Gervasio | |
| 2019/0069036 A1* | 2/2019 | Afshar ............... H04N 21/2401 |
| 2019/0089643 A1 | 3/2019 | Westphal | |
| 2019/0158815 A1 | 5/2019 | He | |
| 2019/0208234 A1 | 7/2019 | Van Brandenburg et al. | |
| 2019/0230142 A1 | 7/2019 | He | |
| 2019/0238861 A1 | 8/2019 | D'Acunto | |
| 2019/0310472 A1 | 10/2019 | Schilt | |
| 2019/0313160 A1 | 10/2019 | Stokking | |
| 2019/0362151 A1 | 11/2019 | Stokking | |

FOREIGN PATENT DOCUMENTS

| | | |
|---|---|---|
| EP | 1 826 978 | 8/2007 |
| EP | 2775701 | 9/2014 |
| EP | 2 814 243 | 12/2014 |
| GB | 2 505 912 | 3/2014 |
| GB | 2 513 139 | 10/2014 |
| GB | 2 524 531 | 9/2015 |
| JP | 2005-142654 | 6/2005 |
| JP | 2012-049806 | 3/2012 |
| WO | WO 2001/95513 | 12/2001 |
| WO | WO 2008/088772 | 7/2008 |
| WO | WO 2009/003885 | 1/2009 |
| WO | WO 2012/168356 | 12/2012 |
| WO | WO 2012/168365 | 12/2012 |
| WO | WO 2013/063094 | 5/2013 |
| WO | WO 2014/057131 | 4/2014 |
| WO | WO 2014/0106651 | 7/2014 |
| WO | WO 2014/111423 | 7/2014 |
| WO | WO 2014/168972 | 10/2014 |
| WO | WO 2015/004276 | 1/2015 |
| WO | WO 2015/008774 | 1/2015 |
| WO | WO 2015/011109 | 1/2015 |
| WO | WO 2015/014773 | 2/2015 |
| WO | WO 2015/059194 | 4/2015 |
| WO | WO 2018/083211 | 5/2015 |
| WO | WO 2015/104451 | 7/2015 |
| WO | WO 2015/197815 | 12/2015 |
| WO | WO 2015/197818 | 12/2015 |
| WO | WO 2016/115983 | 7/2016 |
| WO | WO 2017/029400 | 2/2017 |
| WO | WO 2017/029402 | 2/2017 |
| WO | WO 2017/060423 | 4/2017 |
| WO | WO 2018/011054 | 1/2018 |
| WO | WO 2018/049321 | 3/2018 |
| WO | WO 2018/050606 | 3/2018 |

OTHER PUBLICATIONS

Advani et al., "Optimizing Video Delivery using OpenFlow," Capstan Final Paper, 9 pages, Apr. 25, 2015.
Barniv, Yair et al., "Using EMG to Anticipate Head Motion for Virtual-Environment Applications," IEEE Transactions on Biomedical Engineering, vol. 52, No. 6, pp. 1078-1093 (Jun. 2005).

(56) References Cited

OTHER PUBLICATIONS

Bartolini, Novella et al., "A Walk through Content Delivery Networks," International Workshop on Modeling, Analysis, and Simulation of Computer and Telecommunication Systems, 25 pages, (2003).
Carlier, Axel et al., "Towards Characterizing Users' Interaction with Zoomable Video." Social, Adaptive and Personalized Multimedia Interaction and Access, ACM, New York, NY, 4 pages (2010).
Concolato, C., et al., "Usage of DASH SRD for HEVC Tiling," ISO Contribution ISO/IEC JTCI/SC29/WG11 MPEG2014 (2014).
D'Aguanno, "Lan Protocol Attacks, Part 1, ARP Reloaded," Presented at Defcon 15, Las Vegas, Nevada, 35 pages, Aug. 2007.
Fraunhofer, Fokus, "360 Video Experience on TV Device," www.fokus.fraunhofer.de/go/360, Apr. 7, 2016, 22 pages (2016).
Gheorghe, Lucian et al., "Steering Timing Prediction in a Driving Simulator Task," 2013 35th Annual International Conference of tire IEEE Engineering in Medicine and Biology Society (EMBC), Jul. 3-7, 2013, Osaka, Japan, 4 pages.
Giladi, A. et al, "Descriptions of Core Experiments on DASH Amendment," Systems subgroup/DASH, International Organisation for Stardardisation Organisation Internationale de Normalisation ISO/IEC JTC1/SC29/WG11 Coding of Moving Pictures and Audio, ISO/IEC JTC1/SC29/WG11 MPEG2013/N13977, Geneva, Switzerland, 24 pages (Nov. 2013).
Hannuksela, M.M., et al., (listed on the EP Search Report & ISR as Gabbouj, for EP 14174815.2) "Isolated Regions in Video Coding," IEEE Transactions on Multimedia, 6(2): 259-267 (Apr. 1, 2004).
Haufe, Stefan et al., "Electrophysiology-based detection of emergency braking intention in real-world driving," J. Neural Eng., 11: 1-8 (2014).
Hirabayashi, M. et al., "Improvement on HEVC Tile Track for WD of 14496-15 AMD1," Sony Corporation Proposal, International Organisation for Stardardisation Organisation Internationale de Normalisation ISO/IEC JTC1/SC29/WG11 Coding of Moving Pictures and Audio, ISO/TEC JTC1/SC29/WG11 MPEG2014/M33083, Valencia, Spain, 4 pages (Mar. 2014).
Hirabayashi, M., et al., "Consideration on HEVC Tile Tracks in MPD for DASH SRD," ISO Contribution ISO/IEC JTC1/SC29/WG11 MPEG2014 (2014).
Jennehag, et al., "Gradual Tune-in Pictures for Fast Channel Change," The 8th Annual IEEE Consumer Communications and Networking Conference-Special Session IPTV and Multimedia CDN, pp. 766-770, 2011.
Kuzyakov, et al., "Next-Generation Video Encoding Techniques for 360 Video and VR," retrieved from URL: https://code.fb.com/virtual-reality/next-generation-video-encoding-techniques-for-360-video-and-vr/, 5 pages (Jan. 21, 2016).
Le Feuvre, J., et al., "Support for Efficient Tile Access in the HEVC File Format," Telecom Paris Tech, Canon Research Centre France (2013).
Lee, et al., "Scalable roi Algorithm for H.264/SVC-based Video Streaming," Consumer Electronics, IEEE Transactions 57(2): 882-887 (2011).
Lew, Eileen et al., "Detection of self-paced reaching movement intention from EEG signals," Frontiers in Neuroengineering, vol. 5, Article 13: 1-17 (Jul. 2012).
Mavlankar, A., et al., (listed on the EP Search Report as Yan Ye) "An Interactive Region-of-Interest Video Streaming System for Online Lecture Viewing," Information Systems Laboratory, Department of Electrical Engineering, Stanford University, Proc. of 18th International Packet Video Workshop, pp. 64-71, Dec. 2010.
Ochi, Daisuke et al., "Live Streaming for Omnidirectional Video," IEEE Virtual Reality Conference 2015, Arles, France, 2 pages (2015).
Open Networking Foundation, "Software-Defined Networking: The New Norm for Networks," ONF White Paper, 12 pages, Apr. 13, 2012.
Ramos, et al., "Reducing channel change delay in IPTV by predictive pre-joining of TV channels," Signal Processing: Image Communication, vol. 26, pp. 400-412, 2011.
Sanchez, et al., "Low Complexity Cloud-video-mising using HEVC," 11th annual IEEE CCNC—Multimedia networking, services and applications, 214-218 (2014).
Tokumo, Y, et al., "Dash: Signaling Tile Encapsulation Modes," ISO Contribution ISO/IEC JTC1/SC29/WG11 MPEG2014 (2014).
Wang, Ye-Kui et al., "Signalling of most-interested regions of VR video," MPEG Meeting; May 30, 2016-Jun. 3, 2016; Geneva, 3 pages, (2016).
Wang, Y-K., et al., "Tile Groups," Joint Collaborative Team on Vide Coding (JCT-VC) of ITU-T SG16 WP3 and ISO/IEC JTC1/SC29/WG11, 7th Meeting: Geneva, CH, pp. 1-9 (Nov. 21-30, 2011).
Ye, Y., et al., "ROI Tile Sections," MPEG Meeting, Shanghai, pp. 1-7 (2012).
European Search Report for International Application No. EP 19181221.3, entitled "Rendering Video Stream In Sub-Area Of Visible Display Area." dated Sep. 10, 2019.
Smith, John R., "MPEG-21 Digital Item Adaptation: Enabling Universal Multimedia Access," IEEE Computer Society, (Jan.-Mar. 2004).
Chang, Shif-Fu, et al., "Video Adaptation: Concepts, Technologies and Open Issues," Mitsubishi Electric Research Laboratories (2005).
Reddy, M., "Specification and Evaluation of Level of Derail Selection Criteria," Virtual Reality, 3:132-143 (1998).
Jankowski, J., et al., "Integrating Text with Video and 3D Graphics: The Effects of Text Drawing Styles on Text Readability," Interaction Techniques, (Apr. 2010).
X3D Example Archives: VRML 2 Sourcebook, Chapter 25—Level Of Detail, retrieved: http://www.web3d.org/x3d/content/examples/Vrml2.0Sourcebook/Chapter25-LevelOfDetail/ (No Date Given).
ISO/IEC 23009-5:2017 Information technology—Dynamic adaptive streaming over HTTP (DASH)—Part 5: Server and network assisted DASH (SAND) (Feb. 2017).
Ramakrishna, M., & Karunakar, A. K. (2017). SIP and SDP based content adaptation during real-time video streaming in future internets. Multimedia Tools and Applications, 76(20), 21171-21191 (2017).
"John Carmack on Developing the Netflix App for Oculus," [Online]. Available: https://medium.com/netflix-techblog/john-carmack-on-developing-the-netflix-app-for-oculus-2c8170aaef00. Downloaded: May 31, 2022.
Johansson, I., et al., "Negotiation of Generic Image Attributes in the Session Description Protocol (SDP)," Internet Engineering Task Force (IETF); Request for Comments: 6236, Category: Standards Track ISSN: 2070-1721; pp. 1-23 (May 2011).
Rosenberg, J., "The Session Initiation Protocol (SIP) Update Method" Network Working Group, request for Comments: 3311 Category: Standards Track; pp. 1-4 (Sep. 2002).

\* cited by examiner

RENDERING VIDEO STREAM IN SUB-AREA OF VISIBLE DISPLAY AREA

RELATED APPLICATION

This application claims priority under 35 U.S.C. § 119 or 365 to European Application No. 19181221.3, filed Jun. 19, 2019. The entire teachings of the above application are incorporated herein by reference.

TECHNICAL FIELD

The invention relates to a system and computer-implemented method for rendering a video stream on a display device. The invention further relates to a status message identifying a spatial resolution for streaming the video stream. The invention further relates to a computer program for carrying out the method.

BACKGROUND

Video streams are, when received by a client device (in short also referred to as 'client'), normally displayed on a display device (in short also 'display'). It is known to display video streams full-screen, i.e., occupying substantially all of the visible display area of the display device. However, in many applications, a video stream is not displayed full-screen, but rather in a sub-area of the visible display area.

For example, a video stream may be shown in a 3D environment on a virtual display. Here and elsewhere, the adjective 'virtual' refers to a computer-based representation, e.g., defined by computer graphics, rather than a physical one. If such a 3D environment is then rendered for display, e.g., from a viewing position within the 3D environment and in a particular field of view, the rendered display data may not only show the virtual display but also the surrounding 3D environment. Accordingly, when the rendered display data is displayed, the virtual display, and thereby also the video stream displayed thereon, may only occupy a sub-area of the visible display area. Thus a physical display device may have a visible display area, and the virtual display may be rendered in a sub-area of the visible display area of the physical display device.

Such 3D environments may be used for various purposes, including gaming and multi-user communication, and may be displayed on conventional displays, but also in Virtual or Augmented Reality (VR/AR) using Head Mounted Displays (HMDs). For example, in a so-called 'Social VR' environment, several participants may each wear an HMD to jointly experience a shared 3D environment, such as a living room, in which each of the participants may be represented by a virtual construct, commonly also referred to as 'avatar'. In the living room, a live soccer match may be shown on a virtual display, which may be received as a video stream from a remote server. As the viewing position of each participant may be at some distance from the virtual display, the virtual display may only encompass a part of the HMD's active display area.

There are also various other examples in which a video stream is only displayed in a sub-area of the visible display area. A non-limiting example is that of a windowed operating system or similar type of windowed computing environment in which applications are each rendered in their respective windows, and wherein a video stream may be rendered by a particular application in one of the windows.

Another non-limiting example is that of video conferencing in VR in which an omnidirectional image or video may be used as a 'virtual backdrop' for the video conference and in which video streams of real-time camera recordings of the participants may be displayed as inserts over the omnidirectional image or video. Yet another example is that of a virtual cinema in which a participant is positioned in a virtual cinema and in which a video stream is shown on the virtual cinema's screen. Yet another example is that of a video conferencing where the video streams of several participants are stitched into a mosaic which is then to be displayed full-screen.

It is known to adapt the rendering of the video stream to the fact that the video stream is only displayed in a sub-area of the visible display area. For example, it is known to use spatial anti-aliasing filters when spatially downsizing (downscaling) a video stream to fit such a sub-area, for example using a low-pass filter.

SUMMARY

It would be advantageous to also adapt the streaming of a video stream to the fact that the video stream is displayed in a sub-area of the visible display area.

In accordance with a first aspect of the invention, a system is provided which may be configured for rendering a video stream for display on a display device. The system may comprise:
 a network interface for receiving the video stream by streaming;
 a processor subsystem which may be configured to:
  generate display data defining a visible display area to be displayed by the display device, wherein said generating of the display data comprises rendering the video stream in a sub-area of the visible display area; and
  select a version of the video stream for streaming having a spatial resolution and/or a bitrate selected based on a size of the sub-area.

In accordance with a further aspect of the invention, a computer-implemented method is provided which may render a video stream on a display device. The method may comprise:
 receiving the video stream by streaming;
 generating display data defining a visible display area to be displayed by the display device, wherein said generating of the display data comprises rendering the video stream in a sub-area of the visible display area;
 wherein the method may further comprise:
 selecting a version of the video stream for streaming having a spatial resolution and/or a bitrate selected based on a size of the sub-area.

In accordance with a further aspect of the invention, a transitory or non-transitory computer-readable medium is provided comprising a computer program. The computer program may comprise instructions for causing a processor system to perform either or both of the abovementioned computer-implemented methods.

The above measures may be based on the consideration that the size of the sub-area on which the video stream is displayed may affect the perceptibility of spatial detail in the video stream. There are several reasons for this. One reason is in its most elementary form known for full-screen display of video. Namely, it is known that there is a relation between on the one hand the size of a display and the viewing distance (i.e., the distance of a viewer to the display) and on the other hand the amount of spatial detail of a video which can be perceived by the viewer. Accordingly, it has been considered that for relatively small displays and/or for relatively large viewing distances, a higher spatial resolution video has no or only limited additional value in terms of providing additional spatial detail which can actually be perceived by the viewer compared to a version of the video having a lower spatial resolution.

Surprisingly, in case a video stream is rendered in a sub-area of the visible display area, the size of the sub-area may in many cases also have a significant or even more significant impact on the perceivability of spatial detail in the video stream than the display size and the viewing distance. Namely, if for example the video stream is rendered on a virtual display in a 3D environment, the virtual display and thus the displayed video stream may in many cases only occupy a fraction of the overall visible display area, e.g., 10% or 20%, which may affect the perceivability of spatial detail more so than the display size and the viewing distance. Even in cases where the sub-area is more sizable, e.g., 50%, the size of the sub-area has a significant impact on the perceivability of spatial detail in the video stream and may not be considered in the prior art.

There is also another factor limiting the perceivability of spatial detail which may not be considered in the prior art. With modern displays, e.g. having spatial resolutions of 4K or 8K or even higher, the physical display resolution is often not a limitation in the perceivability of spatial detail when a video stream is displayed full-screen. However, if the video stream is displayed in a sub-area of the visible display area, the active display area which corresponds to this sub-area may only provide limited physical resolution for the display of the video stream. For example, if the sub-area corresponds to 10% of the size of the overall visible display area of a 4K display (3840×2160), the 4K display may only provide a spatial resolution of 384×216 pixels for the display of the video stream. This may greatly affect the perceivability of spatial detail, even if the display size and the viewing distance would otherwise allow such spatial detail to be perceived.

The above measures provide a mechanism which may make the streaming of a video stream adaptive to the size of the sub-area. In general, adaptive streaming is known per se, but is typically based on considerations such as available network bandwidth or decoding capabilities. The inventors have rather considered to select a version of the video stream to be streamed based on the size of the sub-area in which the video stream is displayed. Herein, the size may be expressed as a relative quantity, e.g., expressed in relation to the overall visible display area, but may in some embodiments also be expressed an absolute quantity, e.g., as a spatial resolution of the sub-area in the rendered display data and/or on the active display area of the display. Here, the term 'spatial resolution' may refer to the spatial dimensions of the sub-area in the rendered output frame or on the display's active display area, but may be used as the sub-area may be considered to represent a 'sub-display' for displaying the video stream and may therefore be considered to have a spatial resolution.

The version of the video stream may then be selected in terms of having a particular spatial resolution and/or bitrate, as both parameters are known to determine the amount of spatial detail in the video stream and thereby may represent suitable parameters to be varied based on the size of the sub-area. By selecting a lower spatial resolution and/or lower bitrate for a smaller sub-area and a higher spatial resolution and/or higher bitrate for a larger sub-area, the streaming may be made adaptive to the size of the sub-area. In particular, for a smaller sub-area, it may be avoided to stream a version of the video stream which contains spatial detail which cannot be perceived when the video stream is rendered in the sub-area (non-perceivable spatial detail) but which may incur more technical cost, e.g., in terms of required network bandwidth, decoding capabilities and decoding resource allocation, etc., than a video stream which has a lower resolution and/or lower bitrate. Effectively, it may be avoided to needlessly waste bandwidth on non-perceivable spatial detail. In addition, it may not be needed to apply an anti-aliasing filter, or a less stringent filter may suffice. Conversely, for a larger sub-area, a version of the video stream containing more spatial detail may be selected.

It is noted that the above adaptation mechanism may be combined with existing mechanisms for adaptive streaming, e.g., based on Quality of Service (QoS).

In an embodiment, the video stream may be streamed in a streaming session, and the processor subsystem may be configured to select the version of the video stream before or in a setup phase of the streaming session. This embodiment may have the advantage that a suitable version of the video stream may be streamed at a start of the streaming session, thereby avoiding the need to switch to another version of the video stream shortly after the start of the streaming session.

In an embodiment, the processor subsystem may be configured to select the version of the video stream for streaming in response to a change in the size of the sub-area. The size of the sub-area may change during a streaming session. For example, the size of the virtual display on which the video stream is displayed, or the size of a window in which the video stream is displayed, may be adjusted during the streaming session. A change in the size of the sub-area may have an effect on the perceivability of spatial detail. Accordingly, a version of the video stream may be selected in response to said change in size and based on the size of the sub-area after the change. Accordingly, if the sub-area is increased in size, a version of the video stream may be selected having a higher spatial resolution and/or higher bitrate, and if the sub-area is decreased in size, a version of the video stream may be selected having a lower spatial resolution and/or lower bitrate. In this respect, it is noted that the change in size may in some cases result in the same version of the video stream continuing to be streamed, e.g., in case the change is a minor change, e.g., below a threshold, or if the currently streamed version of the video stream remains suitable in terms of spatial resolution and/or bitrate for the changed size of the sub-area.

In an embodiment, the processor subsystem may be configured to:
  generate the display data by rendering a 3D environment from a viewing position in the 3D environment, wherein said rendering of the 3D environment may comprise rendering the video stream on a virtual display in the 3D environment; and
  select the version of the video stream for streaming in response to a change in a relative position and/or a relative orientation between the viewing position and the virtual display which results in the change in the size of the sub-area.

The inventors have considered that one prominent situation in which the size of the sub-area in which the video stream is rendered may change is when the video stream is rendered on a virtual display in a 3D environment. Namely, such 3D environments are frequently dynamic, in that the viewing position may change, e.g., in response to a user adjusting his/her viewing position, e.g., using a mouse, joystick or the like, and/or in case of VR, the user walking or moving his/her head in the physical environment while being tracked therein. Likewise, the position and/or orientation of the virtual display may be easily manipulated in such a 3D environment, e.g., at the request of the user or via other means. Both factors, both individually and combined, may cause the relative position and/or the relative orientation of the virtual display with respect to the viewing position to be changed. Accordingly, in this embodiment, the system may be configured to, on a continuous or periodic basis, determine the size of the sub-area and select a version of the video stream in accordance therewith.

It will be appreciated that in case of a 3D environment, the relative orientation between the virtual display and the viewer may be such that the virtual display is shown at an angle to the viewer, resulting in the sub-area containing the video stream having a trapezoid shape in the rendered display data and/or on the active display area. In some embodiments, the system may take the shape of the sub-area into account. For example, the version of the video stream may be selected based on a longest one of the parallel sides of the trapezoid, accounting for the fact that more spatial detail may be perceptible at the longest one of the parallel sides.

In an embodiment, the display device may be configured to display the display data using an active display area having a display resolution, and the processor subsystem may be configured to:
 determine an equivalent display resolution for a part of the active display area with which the sub-area of the visible display area is to be displayed; and
 select the spatial resolution and/or the bitrate for streaming the video stream based on the equivalent display resolution.

In this embodiment, the size of the sub-area may be related by the system to the physical resolution of the display. The latter may be known explicitly to the system, e.g., by a configuration parameter, or implicitly, e.g., by assuming that the spatial resolution of the display data buffer or the rendering output buffer or the like corresponds to the physical resolution of the display. For example, if it is known or expected that the display resolution is 4K, e.g., 3840×2160 pixels, and it is known that the sub-area occupies 20% of the visible display area and has the same aspect ratio as the display, the equivalent display resolution for the video stream may be 768×432 pixels, and a version of the video stream may be selected accordingly, for example by selecting a version of the video stream for streaming having exactly a spatial resolution of 768×432 pixels, or if only a limited number of spatial resolutions are available for selection, a version of which the spatial resolution most closely matches the equivalent display resolution. An advantage of this embodiment is that the system may specifically take the physical limitations of the display into account in terms of physical resolution, and may thus adapt the streaming, e.g., by selecting a lower resolution video stream.

In an embodiment, the processor subsystem may be configured to select the version of the video stream from a list, the list identifying versions of the video stream having different spatial resolutions and/or bitrates. For example, in case the video stream is streamed via an adaptive streaming technique, such as HTTP Adaptive Streaming (HAS), and in a particular example via MPEG-DASH (Dynamic Adaptive Streaming over HTTP), the processor subsystem may select the version of the video stream from a manifest file which is provided for the video being streamed. It is noted that here and elsewhere, 'versions of a video stream' may refer to different video streams each showing the same video in terms of content but having a different spatial resolution and/or bitrate. Such versions are in DASH also known as 'representations'.

In an embodiment, the processor subsystem may be configured to select the version of the video stream having the spatial resolution which best matches the equivalent display resolution. Here, 'best matches' may be a resolution which is either higher or lower than the equivalent display resolution yet most similar in terms of horizontal and/or vertical resolution. In some embodiments, the selection may be limited to spatial resolutions above or below the equivalent display resolution.

In an embodiment, the processor subsystem may be configured to request the version of the video stream by sending a message identifying a selected spatial resolution via the network interface to another entity. With this request, the system may indicate to the other entity, being for example a network-based stream source or a transcoder, that the video stream is desired at a particular spatial resolution. Such a request may cause the other entity to provide the video stream at the requested spatial resolution, for example by transcoding a video stream having a higher resolution to a lower resolution. For example, the system may be configured as a HAS (HTTP Adaptive Streaming) client and may be configured to send the message as a status message to a HAS streaming management system. In a specific example, the system may be a DASH (Dynamic Adaptive Streaming over HTTP) client and the HAS streaming management system element to which it must send the message may be a DANE (DASH-Aware Network Element).

In an embodiment, a data structure may be provided defining a status message from a HAS (HTTP Adaptive Streaming) client to a HAS streaming management system, wherein the status message may identify a spatial resolution for streaming a video stream which is to be rendered by the HAS client in a sub-area of a visible display area. In an embodiment, the data structure may be stored in the form of transitory or non-transitory data on a computer-readable medium.

In an embodiment, the processor subsystem may be configured to generate the display data by rendering a 3D environment from a viewing position in the 3D environment, wherein said rendering of the 3D environment comprises rendering the video stream on a virtual display in the 3D environment. An example of a 3D environment is a computer-graphics based 3D environment, e.g., based on vertices, edges and textures, in which the video stream may be represented by a texture.

In an embodiment, the processor subsystem may be configured to generate the display data by rendering an omnidirectional image or video and rendering the video stream as an overlay over a part of the omnidirectional image or video.

In an embodiment, the processor subsystem may be configured to generate the display data by rendering a windowed environment in which the video stream is rendered in a resizable and/or repositionable window. An example of a windowed environment is that provided by a window manager of a windowed operating system.

In an embodiment, the system may be a client device comprising or being the display device. In the former case, the display device may be part of the client device, while in the latter case, the display device may be the client device. In another embodiment, the system may comprise a display interface to the display device. In an embodiment, the display device may be a Head Mounted Display (HMD).

In an embodiment, the system may be an edge computing system configured to stream the display data to a client device which is connected to the display device. For example, the system may be an edge computing system of a 5G or later generation telecommunication network, or any other type of edge computing system, e.g., located at or near an edge between a core network and an access network via which a client device is connected to the core network.

It will be appreciated by those skilled in the art that two or more of the above-mentioned embodiments, implementations, and/or aspects of the invention may be combined in any way deemed useful.

Modifications and variations of any computer-implemented method, system, computer program and/or any computer-readable medium, which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
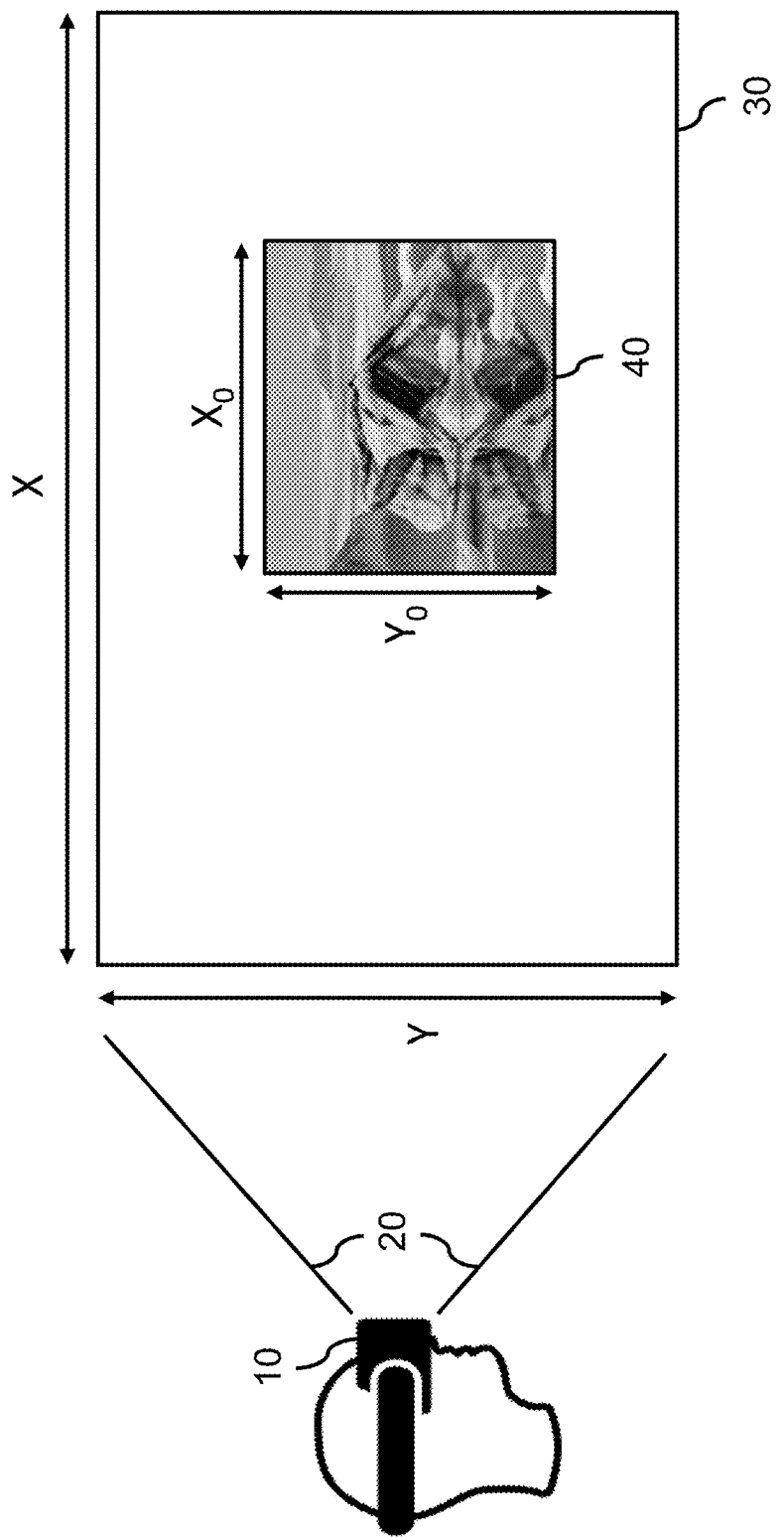
FIG. 1 shows a visible display area of a head mounted display, wherein the visible display area contains a sub-area in which a video stream is rendered.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

X, Y horizontal, vertical dimension of visible display area
$X_n$, $Y_n$ horizontal, vertical dimension of sub-area
10 head mounted display
20 field of view
30-36 visible display area
40-46 sub-area showing video stream
50 data buffer representing visible display area
60 sub-area in data buffer representing visible display area
70 repositioning in 3D environment
80 resizing of virtual display in 3D environment
100 SIP message exchange between SIP clients
120,122 SIP client
140 video stream of 1280×720 pixel resolution
160 video stream of 320×240 pixel resolution
200 SIP message exchange between SIP clients via SIP proxy
220,222 SIP client
230 SIP proxy
240 video stream of 1280×720 pixel resolution
260 video stream of 320×240 pixel resolution
300 system for rendering video stream
320 network interface
322 network communication data
340 processor subsystem
360 data storage
380 display interface
382 display data
400 method of rendering video stream
410 selecting version of video stream to be streamed
420 receiving video stream via network
430 rendering video stream in sub-area of visible display area
440 change detected in size of sub-area
500 computer-readable medium
510 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION

The following describes some embodiments in the context of rendering a video stream in a Virtual Reality (VR) environment, referring to a virtual environment which is viewable using a Head Mounted Display (HMD) and which is typically only rendered within a limited field of view which is selected based on a viewing orientation of the user, with the latter being determinable by known head tracking techniques.

For example, in some embodiments, the virtual environment may be a 3D environment, e.g., defined by vertices, edges and textures, in which the video stream may be shown on a virtual display, for example by rendering the video data of the video stream as a texture on the surface of an object in the virtual environment. In other embodiments, the virtual environment may be established a background object in the form of an omnidirectional image or video, and a foreground object in the form of an overlay or insert in which the video data of the video stream is rendered.

Typically, in such types of virtual environments, the video stream is rendered such that it only occupies a sub-area of the visible display area. An example of a VR application in which a video stream only occupies a sub-area of the visible display area is 'social VR', in which multiple users may be represented in a virtual environment by having their video recorded, streamed and rendered in real-time as a 'video avatar' in the virtual environment. Another example is VR-based screen or content sharing, in which screen content may be shared between users as a video stream which may be displayed on a virtual display in the VR environment. Yet another example is that of a VR-based virtual theater, such as Netflix VR, in which a movie or TV show may be shown by rendering its video stream on a screen in the virtual theater.

It will be appreciated, however, that the techniques described as part of the following embodiments may be equally used in any non-VR application in which a video stream is rendered in a sub-area of the visible display area. Such types of non-VR applications are also elucidated in the summary section and elsewhere.

It is further noted that throughout this specification, any reference to a 'video stream' may refer to a data representation of a video which is suitable for being streamed, e.g., using known streaming techniques. Such a video stream may be encoded using known coding techniques, for example those based on MPEG-2 Part 2, MPEG-4 Part 2, H.264 (MPEG-4 Part 10), HEVC, etc. In the Figures, video streams may be schematically represented by a single video frame, i.e., by a single image.

FIG. 1 shows a visible display area 30 of an HMD 10, in which the visible display area 30 contains a sub-area 40 in which a video stream is rendered. The visible display area 30 may correspond to an area which is displayable within the field of view 20 of the HMD 10, with the field of view itself being schematically represented in FIG. 1 by a cone-like shape. The visible display area 40 may be represented by a display data buffer or a rendering output buffer or the like, and may have spatial dimensions X, Y which may correspond to the physical resolution of the display 10 or which have been determined in another manner. The sub-area 40 may only occupy a part having spatial dimensions $X_0$, $Y_0$ which are typically both smaller than X, Y (although in some cases, only one of the spatial dimensions may be smaller). This is also illustrated in FIG. 2, in which a data buffer 50 is shown which corresponds to the visible display area, and which contains the sub-area 60 in which a video stream is rendered.

Figure 2:
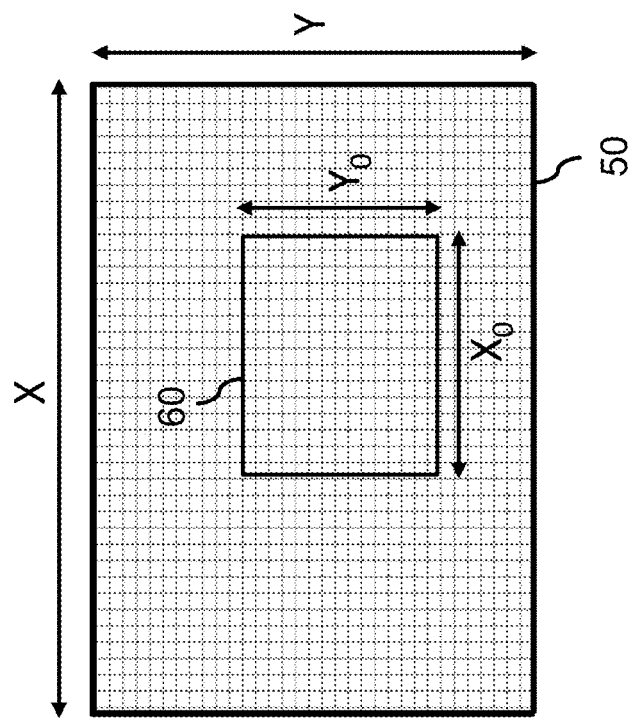
FIG. 2 illustrates a data buffer which corresponds to a visible display area, and which contains a sub-area in which a video stream is rendered.

FIGS. 1 and 2 also illustrates a problem with rendering a video stream in a sub-area of the visible display area of a display, in that displays typically have a limited display resolution, and since the video stream is only rendered in a sub-area of this limited display resolution, the effective spatial resolution for rendering the video stream is still (significantly) smaller than the overall display resolution. For example, if the sub-area corresponds to 10% of the size of the overall visible display area of a stereoscopic HMD having a 4K resolution for each of the eyes, each 4K display may only provide a spatial resolution of 384×216 pixels for the display of the video stream. The above also applies to a visible display area of which the spatial dimensions do not (exactly) match the physical resolution, but are smaller. In this case, the physical display resolution itself may not be the limiting factor, but rather the resolution of the display buffer or the rendering output buffer or the like which represents the visible display area.

Figure 3:
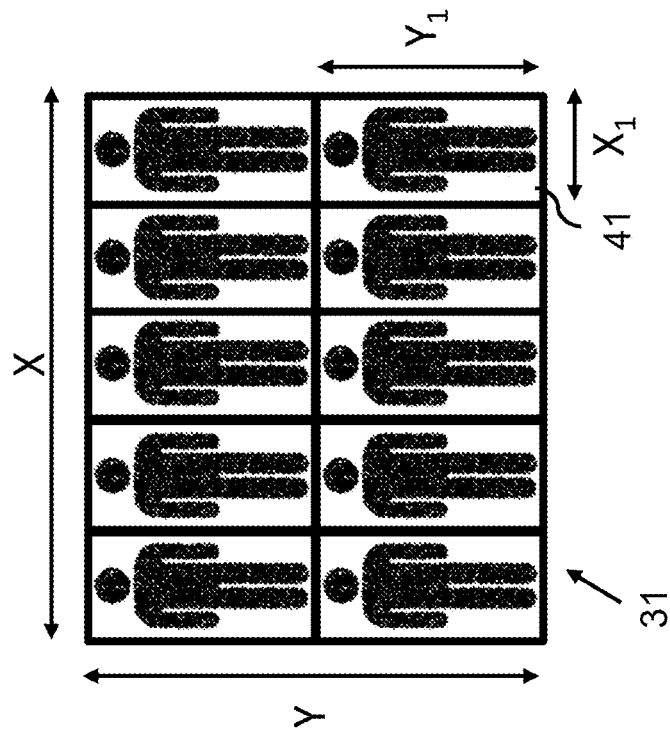
FIG. 3 shows a visible display area being comprised of a mosaic of video streams of participants of a video conferencing session.

FIG. 3 shows a non-VR example in which the visible display area 31 is comprised of a mosaic of video streams of participants of a video conferencing session. Here, a so-called VR conference bridge or VR MCU (Multipoint Control Unit) may combine the video streams of multiple participants in a single mosaic, with said combining also being referred to as 'stitching'. For client devices, it may be difficult to process many separate video streams of different participants, for example because a hardware video decoder can typically only decode one video stream concurrently. The VR conference bridge or VR MCU may therefore stitch the video streams of many participants together and create a single output video stream that can be decoded more easily by each receiving client device. However, when including many participants in one mosaic, the video stream of each participant would need to be displayed in a relatively small sub-area of the mosaic, and thus in a relatively small sub-area of visible display area when the mosaic is displayed full-screen. As such, while the visible display area 31 may have a spatial resolution of X, Y, the sub-area available for each video stream 41 may only have a spatial resolution of $X_1$, $Y_1$ which is smaller than X, Y, namely being in this specific example $X_1=X/5$ and $Y_1=Y/2$.

As indicated in the summary section, when streaming a video stream to a client (which term includes the VR conference bridge and VR MCU as receiving entity of the video stream and thus as a 'client' receiving the video stream), it may be disadvantageous to stream the video stream at a higher resolution if the video stream is only displayed in a sub-area providing a lower resolution to the video stream.

In general, this may be addressed by, at the client, determining the size of the sub-area and selecting a version of the video stream for streaming having a spatial resolution and/or a bitrate selected based on the size of the sub-area.

In a specific embodiment, this may for example involve the following steps:

1) The receiver of the video stream and the sender of the video stream may exchange information such as their capabilities.

2) The receiver of the video stream may determine a desired spatial resolution for the video stream in view of the size of the sub-area in which the video stream is to be rendered, for example taking the display's resolution into account.

3) The sender of the video stream may stream the video stream to the receiver at the desired spatial resolution.

The receiver may elsewhere also simply be referred to as a 'client' with the understanding that this may also include 'server-type' client such as a VR conference bridge, VR MCU or an edge computing server, while the sender may henceforth also simply be referred to as 'server' with the understanding that this may also be what is traditionally understood as a client device, such as in the case of the FIG. 3 example.

The exchange of information is an optional step, but may involve the client and server exchanging information such as the maximum resolution supported by the client's decoder. This may be done by the client checking what their decoding limitations are, and may be important for a VR bridge generating video mosaics. The server may also indicate at which spatial resolutions a video stream may be provided, for example by indicating which pre-encoded formats are available and/or the spatial resolutions to which it may adapt to, e.g., by transcoding a video stream. In this initial phase, the client may also indicate the size of the sub-area to the server. This may be done in various ways, for example by indicating a spatial resolution of the sub-area, or by indicating an initial placement of a virtual display and expected size thereof.

In a specific example which involves streaming by MPEG DASH, the exchange of information may involve the server providing a Media Presentation Description (MPD) to the client, this being an example of a so-called manifest or manifest file. The MPD may list and thereby identify different version of a video stream, each having a different spatial resolution and/or bitrate. The client may then select a version of the video stream by a selection from the MPD. Alternatively, the client may indicate a desired resolution to the server, e.g., having an untypically low spatial resolution, and indicate this to the server in a manner as described further onwards. It is noted that the above-described mechanism may also be used in the context of other HTTP Adaptive Streaming (HAS) techniques, and not only in MPEG-DASH.

For video streaming using the Session Initiation Protocol (SIP), the aforementioned exchange of information may involve SIP messages being exchanged between the client and server with respect to available spatial resolutions, in a manner known per se. Thereby, the client may be informed of which versions of a video stream are available for streaming. As an extension to current SIP protocols, a client may, in its response to an initial SIP INVITE message, indicate other desired resolutions than provided by the offering server. Contrary to DASH, in SIP (which normally uses RTP streaming), switching spatial resolution during a session is not customary. As an extension to current SIP protocols, the indication that a client is capable of such switching during a session may be sent in the SIP setup phase as a session level parameter. The above is also further discussed with reference to FIGS. 7 and 8

Once a client has started streaming the video stream, the client may verify that the video stream is in a suitable spatial resolution. For that purpose, the client may determine the size of the sub-area in which the video stream is (to be) rendered, and compare this to the spatial resolution of the video stream. It will be appreciated that the size may initially be determined or expressed in various ways, e.g., as a number of pixels but also as spatial X and Y dimensions, both of which may then be used to select a version of the video stream having a particular spatial resolution and/or the bitrate.

For example, in a relatively 'low level' approach, with this level referring to the level of abstraction from rudimentary computing operations, the client may simply count the number of pixels that a video stream occupies in the display data buffer or the rendering output buffer or the like, for example by suitably modifying or interfacing with a rendering engine or a rendering pipeline. In a more 'high level' approach, the client may use geometric information which may directly or indirectly define the sub-area in order to determine the size of the sub-area. For example, when the sub-area represents a rendered version of a virtual display in a 3D environment and which virtual display is defined as coordinates in a 3D environment, the coordinates may be used to determine the size of the sub-area. For example, A-frame or a similar VR rendering framework may be used to determine the size of the sub-area based on the distance and orientation of the virtual display to a viewing position from which the 3D environment is rendered, together with the spatial resolution of the visible display area.

In general, the size of the sub-area may be determined in various ways, e.g., as an absolute measure such as the number of pixels or the spatial dimensions of the sub-area, which again may be a measure expressed in pixels. The size of the sub-area may also be a relative measure, e.g., a percentage, and may be defined in relation to the visible display area. Such a relative measure may be translated into an absolute measure by for example applying the percentage to the size of the visible display area, which again may be expressed in various ways, e.g., in terms of number of pixels or the spatial dimensions of the visible display area. In this respect, it is noted that the spatial dimensions of the visible display area may correspond to the spatial resolution of the display, but may in some cases also be different, e.g., lower or higher.

Figure 4:
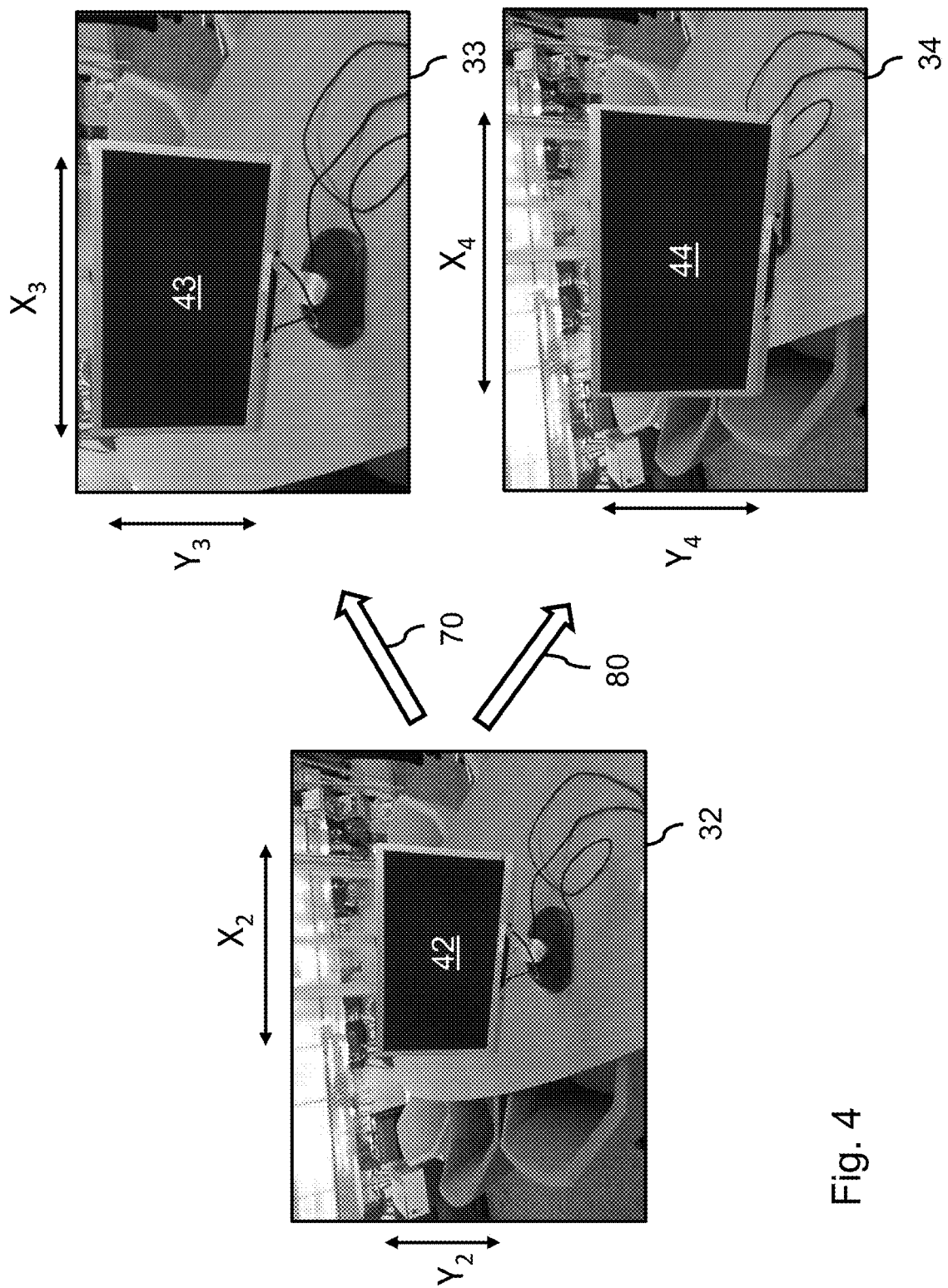
FIG. 4 illustrates a virtual display in a 3D environment and a) a repositioning of a viewing position in the 3D environment towards the virtual display and b) a resizing of the virtual display in the 3D environment, both actions causing the sub-area which represents the virtual display in the visible display area to be increased in size.

FIG. 4 shows a visible display area 32 showing a rendered photorealistic 3D environment which contains a virtual display. The virtual display provides a surface in the 3D environment for the display of a video stream, which after the rendering of the 3D environment occupies a sub-area 42 of the visible display area 32. In the example of FIG. 4, the virtual display is shown as a representation of an actual physical display, e.g., a computer monitor, but this does not need to be the case. Namely, the virtual display may also have any other form, and may in some cases not have a visible structure other than providing a surface on which the video stream is displayed (in the analogy of a 'bezel-less' physical display). As such, any type of 2D or 3D surface may be considered a virtual display if it is used for displaying the video stream.

As illustrated in FIG. 4, the sub-area 42 may have spatial dimensions $X_2, Y_2$ in the visible display area 32 and thereby provide a spatial resolution of $X_2 \times Y_2$ for the display of the video stream. It is noted that in this example, the sub-area 42 is assumed to be rectangular although it is shown slightly tilted by the virtual display in the 3D environment being slightly rotated with respect to the viewing orientation. The implications of non-rectangular sub-areas will be discussed with reference to FIG. 6.

A client may render a video stream in the sub-area 42, of which the spatial resolution and/or bitrate may have been selected based on the size of the sub-area 42. However, during operation, the size of the sub-area 42 may change. For example, as indicated by arrow 70, the size of the sub-area 42 may change by the viewing position in the 3D environment changing such that the relative position and/or relative orientation between the viewing position and the virtual display changes. More specifically, the user may have moved closer towards the virtual display in the 3D environment. As a result, the size of the sub-area 43 in the visible display area 33 may be increased, e.g. to $X_3 \times Y_3$ being larger than the previous size of $X_2 \times Y_2$. Another example is indicated by arrow 80, in which the user may have decided to increase the size of the virtual display, e.g., via a user interface, for example by setting the size of the virtual display from 'M' to 'L' or by using an appropriate gesture such as a 'pinch-to-zoom' gesture in conjunction with the virtual display. Also in this example, the size of the sub-area 44 in the visible display area 34 may be increased, e.g., to $X_4 \times Y_4$ being larger than the previous size of $X_2 \times Y_2$. In both cases, the client may redetermine, e.g., in response to the change, if the current version of the video stream is still appropriate for the increased size of the sub-area, and if not, select another version of the video stream for streaming, e.g., having a higher spatial resolution and/or bitrate.

Figure 6:
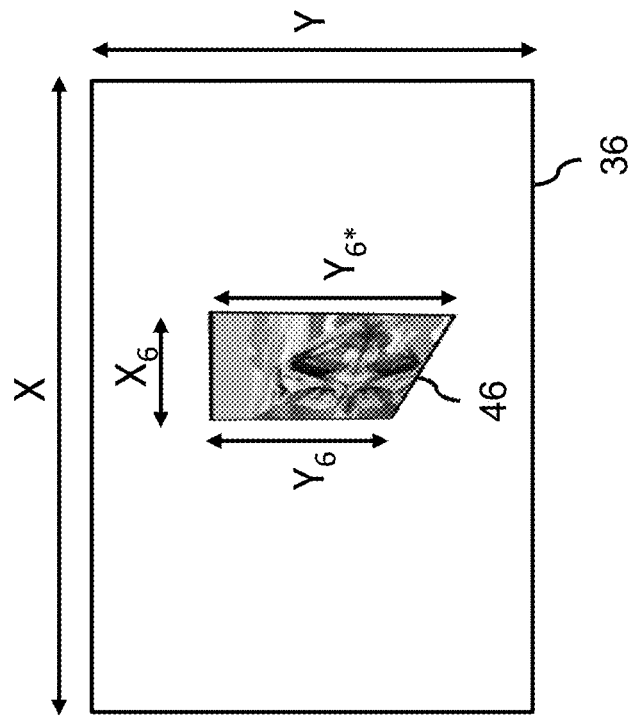
FIG. 6 illustrates the sub-area having a trapezoid form.
Figure 5:
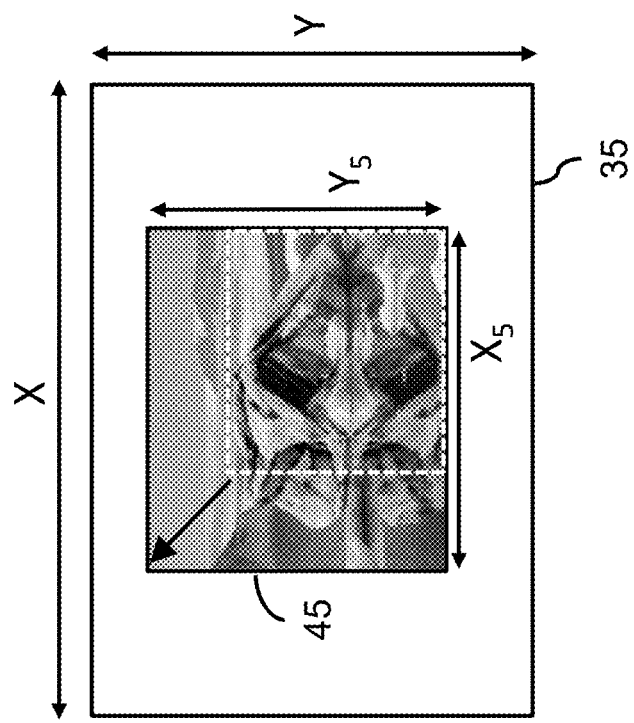
FIG. 5 illustrates the sub-area having been resized.

FIG. 5 provides a more general illustration of the size of a sub-area 45 of a visible display area 35 having increased to $X_5 \times Y_5$. It is noted that such resizing may in other examples also involve a decrease in size, or a change in general shape of the sub-area, e.g., due to a perspective transformation as also illustrated in FIG. 6. In all of these cases, the size of the sub-area 45 may be determined in various ways to account for the effect of the (resized) size of the sub-area on the visibility of spatial detail, and thereby on the desired spatial resolution and/or bitrate of the video stream.

FIG. 6 illustrates a sub-area 46 having a non-rectangular form in the visible display area 36, and in particular a trapezoid form. Such non-rectangular forms may occur when for example the sub-area corresponds to a virtual display in a 3D environment having a surface of which the normal is not parallel to the viewing orientation, and/or if the rendering uses a perspective projection, and/or if the virtual display itself has a non-rectangular shape, etc. Typically, the video stream itself will have a rectangular shape, which may mean that the video stream may be mapped to the non-rectangular shape during rendering, resulting in a distortion and thereby a non-uniform perceptibility of spatial detail across the sub-area 46. In the example of FIG. 6, this may mean that more spatial detail may be perceived at the right-hand side of the sub-area 46, having vertical dimensions $Y_6^*$, than at the left-hand side of the sub-area 46, having vertical dimensions $Y_6$ which are smaller than $Y_6^*$. The size of such a non-rectangular sub-area 46 may be determined in various ways, e.g., by using geometric information defining the shape of the virtual display and/or the relative position and/or relative orientation of the virtual display with respect to the viewer, etc. Likewise, the size of a non-rectangular sub-area may be defined in various ways. For example, the outer (largest) dimensions of the sub-area 46 may be used, e.g. $X_6 \times Y_6^*$, which effectively treats the sub-area 46 as a rectangular sub-area 46 given that the perceptibility of spatial detail at the right-hand side of the sub-area 46 is the same as that of a rectangular sub-area of dimensions $X_6 \times Y_6^*$. Alternatively, an average of the vertical dimensions may be used, e.g., $X_6 \times \frac{1}{2} \times (Y_6 + Y_6^*)$, or if the size is expressed as a single number, a geometric measure or pixel count of the true size of the sub-area.

If, as indicated with reference to FIG. 4 and elsewhere, the size of the sub-area changes during streaming of the video stream, the client may re-evaluate the selection of the video stream, for example by again selecting a version of the video stream which fits the new size of the sub-area, and if the newly selected version of the video stream is a different version than currently streamed, effecting the streaming of the new version. The latter may be carried out in various ways, depending for example on the streaming protocol, but may have a similar result, in that the client switches to a new version of the video stream which is better suited for the new size of the sub-area.

For example, in MPEG DASH (but also applying to other HAS techniques), the client may learn from the MPD the available representations of the content (i.e., versions of the video stream) and request the representation that best fits the size of the sub-area. Alternatively, if no suitable representation is available, the client may send a request identifying a desired spatial resolution and/or bitrate to a HAS stream management element, such as a DANE (Dash Aware Network Element), to generate the desired representation, e.g., by transcoding another version of the video stream.

More specifically, with DASH SAND (see ISO/IEC 23009-5:2017—Part 5), a DASH client may exchange messages with Dash Aware Network Elements (DANEs), and DANEs may exchange messages between themselves as well. The interface between a DASH client and a DANE may be extended with a new status message, for example labeled 'DesiredResolution', which may have the following syntax:

| Parameter | Type | Cardinality | Description |
| --- | --- | --- | --- |
| DesiredResolution | array | 1..N | The ordered list of desired resolutions. Preferred resolutions are listed first. |
| resolution | object | 1 | Specification of the desired resolution. |
| Width | integer | 1 | Desired width in pixels. |
| Height | integer | 1 | Desired height in pixels. |
| Aspect Ratio | object | 0..1 | As not all resolutions may be supported by the DANE, specifying the aspect ratio allows the DANE to create or request an aspect ratio it supports. |
| Width | double | 1 | Width of the aspect ratio. |
| Height | double | 1 | Height of the aspect ratio. |

After receiving such a status message, a DANE may decide to use transcoding to generate a version of the video stream at the desired resolution, or to request such a version of the video stream upstream from another DANE. Of course, the DANE may also need to create a new MPD. By using the (existing) PER message MPDValidityEndTime, the DANE may instruct the DASH client to fetch the update of the MPD, to be able to switch to the newly generated version of the video stream.

The status message may also be adapted, or another type of DASH signaling may be provided, to specifically request a video stream to be transcoded by an edge computing server at a network edge, e.g., between a core network and an access network via which the client is connected to the core network.

The switching of a video stream may be effected in the context of SID/SDP on the basis of the SIP re-INVITE message, which allows a client to update parameters of a session (such as the set of media streams and their codecs), see https://tools.ietf.org/html/rfc3311. This update mechanism may be used to add spatial resolutions, e.g., using the Image Attribute feature (https://tools.ietf.org/html/rfc6236 (see section 3.2.8)) and/or bitrates. A client may therefore effect a switching from a first resolution video stream to a second resolution video stream by removing the first resolution and by adding the second resolution, and/or by modifying the order of spatial resolutions such that a preference is conveyed for the second spatial resolution.

Figure 7:
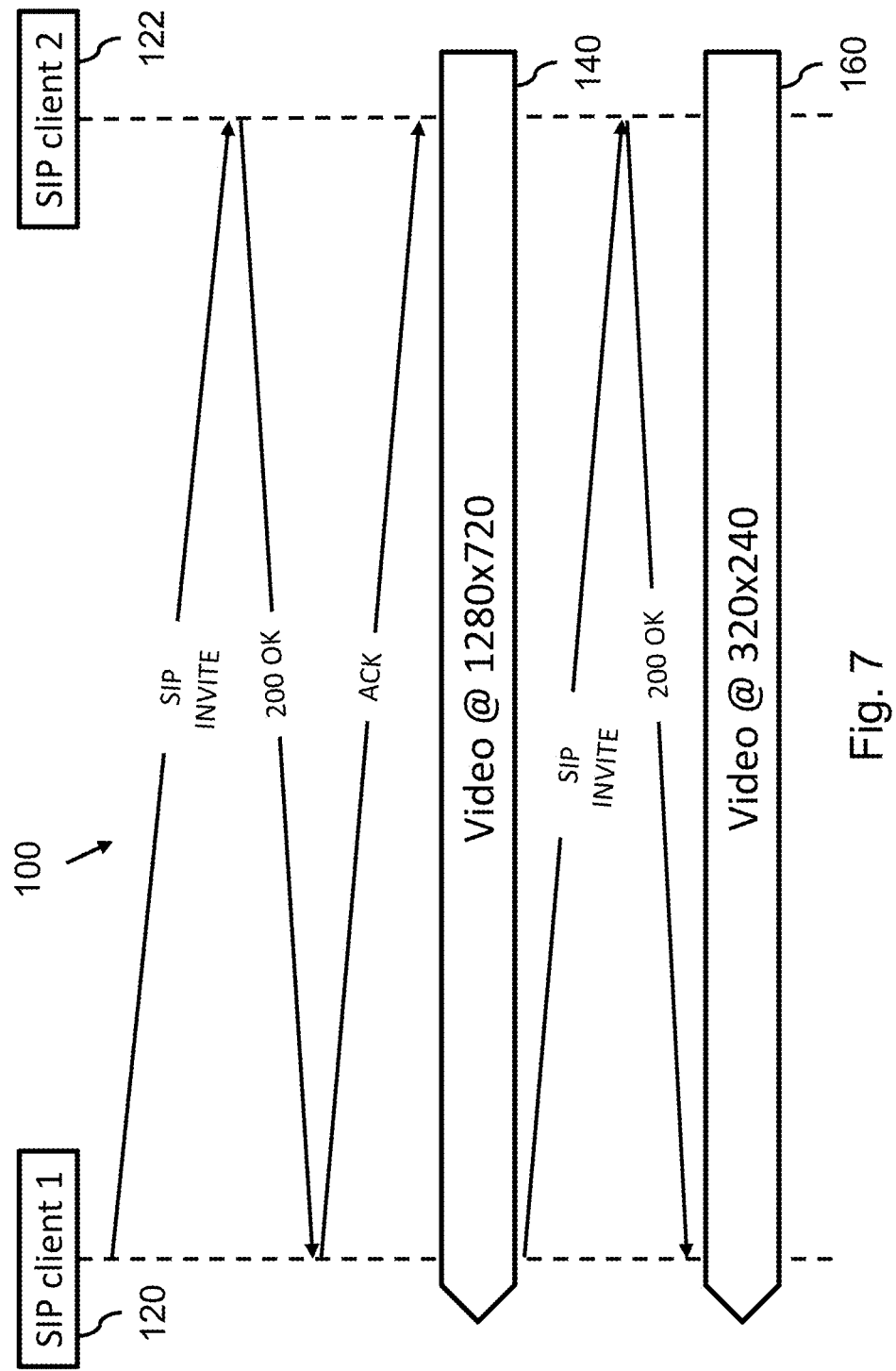
FIG. 7 shows a SIP message exchange between SIP clients to switch from a video stream having a higher resolution to a video stream having a lower resolution.

FIG. 7 shows a SIP message exchange 100 between SIP clients 120, 122 by which the first SIP client 120 may switch from a video stream having a higher resolution, e.g., 1280×720 pixels, to a video stream having a lower resolution, e.g., 320×240 pixels. In this example, both SIP clients 120, 122 may initially setup a connection and start communicating, e.g., via the 'SIP INVITE', '200 OK' and 'ACK' messages, resulting in a video stream of 1280×720 pixels being streamed 140 from the second SIP client 122 to the first SIP client 120. At a certain point in time, the sub-area in which the video stream is displayed may be resized, and as such, the first SIP client 120 may determine that a lower resolution video stream may suffice, e.g., of 320×240 pixels. The first SIP client 120 may then effectively request the lower resolution video stream by sending a SIP re-INVITE message listing all the spatial resolutions that it can receive, which may now omit the higher resolution, e.g., of 1280×720 pixels, and only list the lower resolution of 320×240 pixels and/or prioritize said resolution in the listing. For example, such a SIP re-INVITE message may contain the following:

---

SIP re-INVITE, SDP NEGOTIATION OF GENERIC IMAGE ATTRIBUTES
...
   a=imageattr:99 recv [x=176,y=144] [x=224,y=176] [x=272,y=224,q=0.6] [x=320,y=240]
...

---

The second SIP client 122 may respond with a '200 OK' message and by streaming 160 the video stream at the lower resolution of 320×240 pixels.

Figure 8:
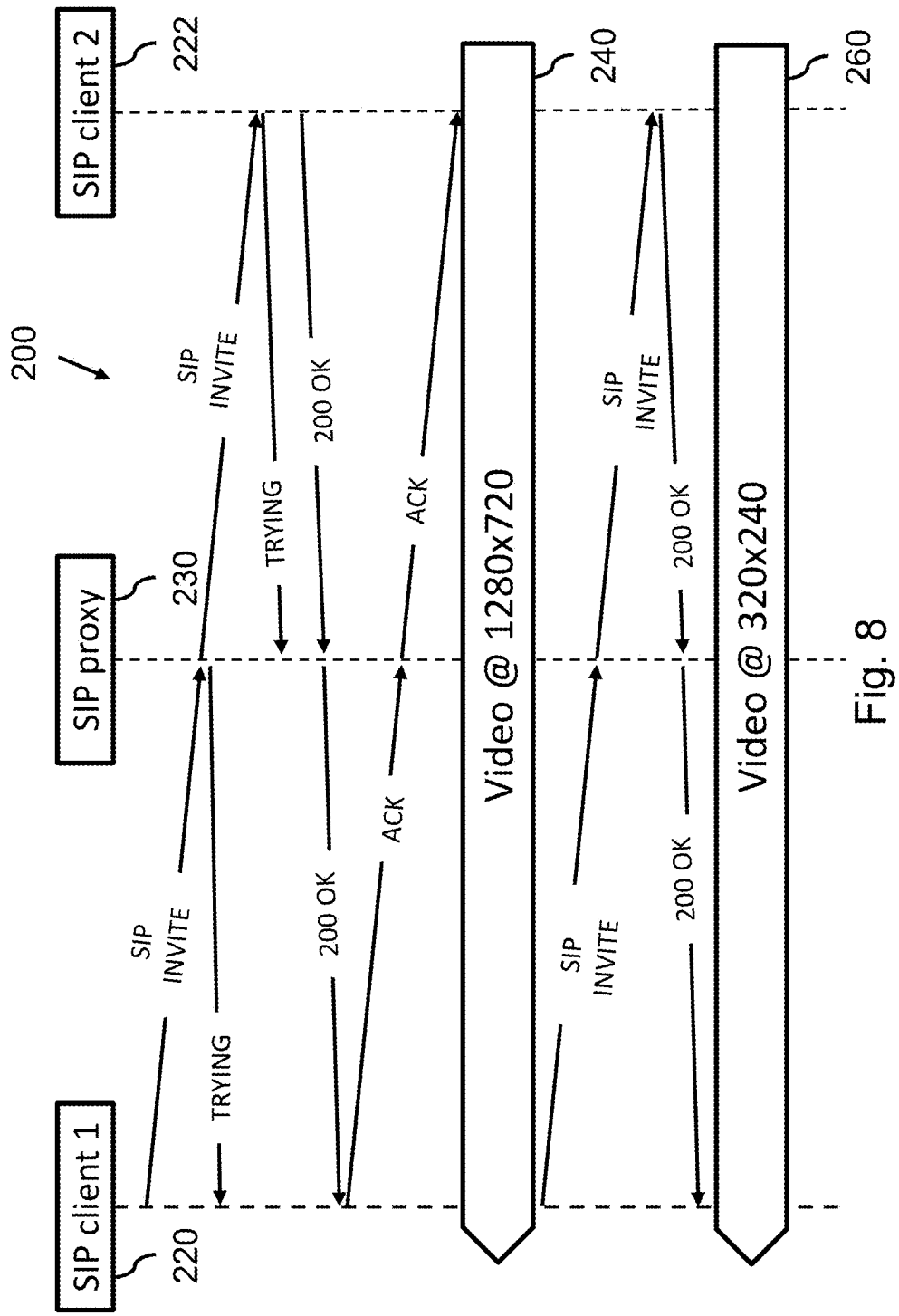
FIG. 8 is similar to FIG. 7 but shows a SIP message exchange between the SIP clients taking place via a SIP proxy.

FIG. 8 is similar to FIG. 7 but shows a SIP message exchange 200 between a first and second SIP client 220, 222 taking place via a SIP proxy 230. The message exchange is similar to that of FIG. 7, except that all messages are forwarded via the SIP proxy 230. When a message passes through the SIP proxy, there may be signaling informing the SIP proxy that the request is trying to be filled, which is represented in FIG. 8 by the messages labeled 'Trying'. Similarly, such messages may be sent by the SIP proxy to the SIP client when forwarding a message of the SIP client.

In general, the same mechanisms which may be used to select a different version of the video stream in terms of spatial resolution and/or bitrate may be used to select a different version of the video stream depending on the distance and/or angle at which the user views the physical display. Namely, both the physical viewing distance and angle affect the perceptibility of spatial details in the video stream, and may thereby affect which spatial resolution and/or bitrate is sufficient. The distance and angle between the user and the display may be determined in various ways, for example using face detection techniques. For example, if the client is a device having a front-facing camera, such as a smartphone or tablet or camera-equipped television, face detection may be applied to the image data acquired by the front-facing camera. The distance of the user the display may then be estimated based on a size of a detected face in the image data, and the angle of the user to the display may be estimated based on a relative position of the detected face within the spatial outline of the image data. Another specific example is that of a mobile device, in which the angle of the display to the user may be estimated using an orientation sensor of the mobile device and by assuming that, e.g., any deviation from a right angle is due to the user not directly facing the mobile device and its display. It will be appreciated that the above techniques may be applied not only to determine the spatial resolution and/or bitrate of the video stream shown in the sub-area of the visible display area, but also to determine the spatial resolution and/or bitrate of any other video stream shown in the visible display area, for example one that is shown full-screen in the visible display area or in the background of the inserted video stream.

The techniques described in the above paragraph, and any mechanism described elsewhere to select a spatial resolution for streaming a video stream, may also be used to select the spatial resolution of any other type of content which is rendered in a sub-area or in all of the visible display area, such as computer graphics which are rendered in real-time at the selected spatial resolution. Such rendering may be performed by the client itself, e.g., using known real-time '3D rendering' techniques, but also by a server which subsequently streams the rendered content to the client as a video stream. In the latter example, the client may not only determine at which spatial resolution the video stream is streamed to the client, but also at which spatial resolution the content is rendered by the server. This may avoid a need for transcoding.

The switching of video streams may be timed based on an estimated attention of a viewer. Namely, an abrupt change in spatial resolution and/or bitrate may be noticeable to a user, and thereby reduce the Quality of Experience (QoE) of the user. The switching may thus take place when a user is deemed to pay less or no attention to the video stream. To estimate the attention, any known technique may be used, including but not limited to eye tracking techniques by which it may be determined whether the user looks at the video or rather away from the video.

Additionally or alternatively, the switching may be made less noticeable by gradually fading to the new version of the video stream, instead of abruptly switching thereto. For example, when switching to a higher quality stream (higher spatial resolution and/or bitrate), both streams may be received and decoded simultaneously for a limited transition period, and a single output may be generated in which over time progressively more weight is given to the higher quality stream, making the output progressively better. A form of gradual fading may also be possible without receiving and decoding both video streams simultaneously. For example, when switching to a lower quality stream, the higher quality stream may be filtered so as to gradually reduce its quality over time before 'abruptly' switching to the lower-quality stream.

The techniques described in this specification may be applied to any type of video stream, e.g., 2D video but also 3D volumetric video or 3D multiview video or point cloud video or time varying meshes representing video, etc. In many cases, the sub-area may still be a 2D area, e.g., when displaying a 3D volumetric video on a 2D display, but may in case of holographic and similar types of displays also be a 3D area. The size of the area may be determined and related to a desired spatial resolution and/or bitrate of the video stream in a similar manner as described for 2D video.

Figures 9, 10, 11:
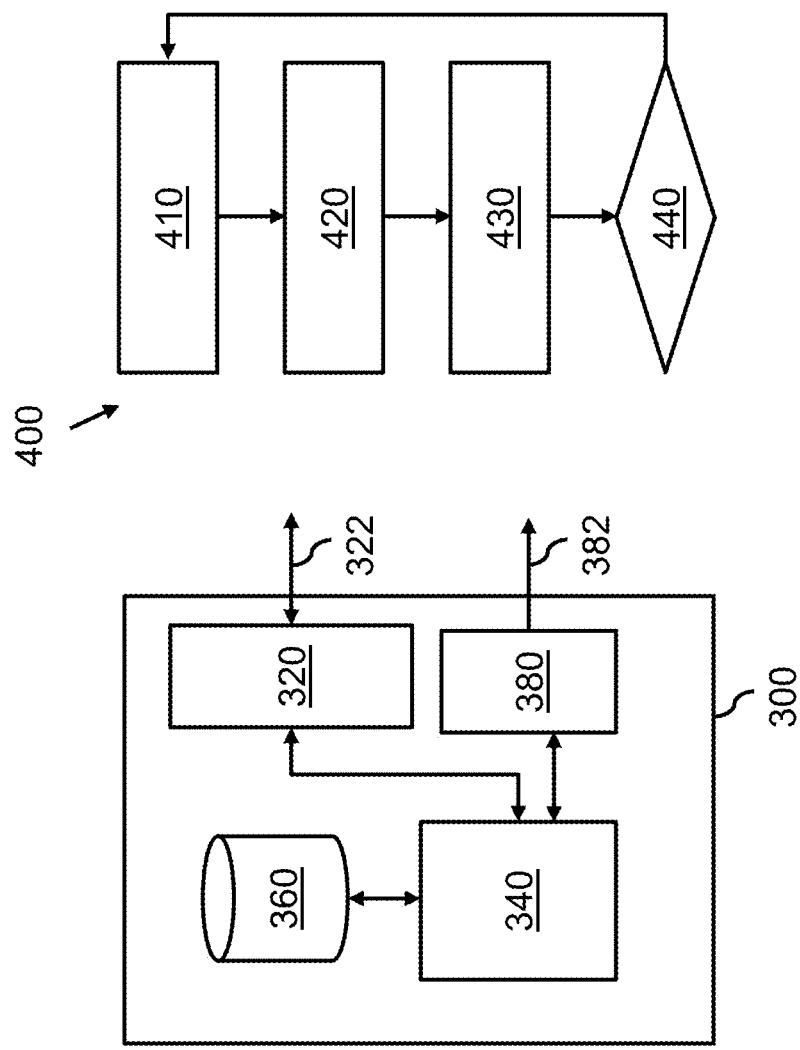
FIG. 9 shows a system for selecting and rendering a video stream.
FIG. 10 shows a method for selecting and rendering a video stream.
FIG. 11 shows a computer-readable medium comprising non-transitory data.

FIG. 9 shows a system 300 for rendering a video stream. The system 300 may represent a client or client device as described elsewhere in this specification. The system 300 is shown to comprise a network interface 320 for receiving the video stream by streaming from a stream source, e.g., using data communication 322. The network interface 320 may be any suitable type of network interface, such a wireless network interface, e.g., based on Wi-Fi, Bluetooth, ZigBee, 4G or 5G mobile communication, or a wired network interface, e.g., based on Ethernet or optical fiber. For example, the network interface 320 may be a local area network (LAN) network interface or an interface to wide area network (WAN) such as the Internet.

The system 300 is further shown to comprise a processor subsystem 340 which may be configured, e.g., by hardware design or software, to perform operations described elsewhere this specification in as far as relating to the generating of the display data and the selection of a version of the video stream for streaming. For example, the processor subsystem 340 may be embodied by a single Central Processing Unit (CPU), but also by a combination or system of such CPUs and/or other types of processing units, such as for example Graphics Processing Units (GPUs). In a specific example, the generating of the display data may be performed jointly by one or more CPUs and one or more GPUs. For example, the GPU(s) may perform the actual rendering and the CPU(s) the higher-level orchestration of the rendering.

The system 300 is further shown to comprise a data storage 360, such as internal memory, a hard disk, a solid-state drive, or an array thereof, which may be used to store or buffer data such as received parts of the video stream and/or decoded video data parts and/or any analysis results. The system 300 is further shown to comprise a display interface 380 for outputting the display data 382 to a display device (the latter not being shown in FIG. 9). In some embodiments, the system 300 may comprise the display device, or may be integrated into a display device.

The system 300 may be embodied by a (single) device or apparatus. For example, the system 300 may be embodied as smartphone, personal computer, laptop, tablet device, gaming console, set-top box, television, monitor, projector, smart watch, smart glasses, media player, media recorder, head mounted display device, etc. The system 300 may also be embodied by a distributed system of such devices or apparatuses. In other examples, for example those in which the system 300 is an edge computing server, the system 300 may be embodied by a server or by a distributed system of servers, or in general by one or more network elements.

In general, the system 300 of FIG. 9 may be embodied as, or in, a device or apparatus. The device or apparatus may comprise one or more (micro)processors which may represent the processor subsystem 340 of the system 300 and which may execute appropriate software. Software implementing the functionality of the system 300 may have been downloaded and/or stored in a corresponding memory or memories, e.g., in volatile memory such as RAM or in non-volatile memory such as Flash. Alternatively, the processor subsystem 340 may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of the system 300 may be implemented in the form of a hardware circuit.

FIG. 10 shows a computer-implemented method 400 for rendering a video stream on a display device. The method 400 may comprise, in a step titled "RECEIVING VIDEO STREAM VIA NETWORK", receiving 420 the video stream by streaming. The method 400 may further comprise, in a step titled "RENDERING VIDEO STREAM IN SUB-AREA OF VISIBLE DISPLAY AREA", generating 430 display data defining a visible display area to be displayed by the display device, wherein said generating of the display data comprises rendering the video stream in a sub-area of the visible display area. It will be appreciated that steps 410 and steps 420 may in many cases be performed concurrently, in that the video stream may be received in a streaming manner while a previous frame of the video stream is being rendered.

The method 400 is further shown to comprise, in a step titled "SELECTING VERSION OF VIDEO STREAM TO BE STREAMED", selecting 410 a version of the video stream for streaming having a spatial resolution and/or a bitrate selected based on a size of the sub-area. As also indicated elsewhere, the selection of the version of the video stream may be performed before said version of the video stream is actually streamed, but may also be performed while another version of the video stream is streamed. As such, although FIG. 10 shows the selection step 410 taking place before the receiving step 420, another version of the video stream may be streamed before or concurrently with step 410. In general, the selection step 410 may be performed at a start of a streaming session, but also when a change is detected in the size of the sub-area, which is illustrated in FIG. 10 by the event 440 titled "CHANGE DETECTED IN SIZE OF SUB-AREA" causing the selection step 410 to be performed again.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 500 as for example shown in FIG. 11, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 11 shows by way of example an optical storage device 500.

In an alternative embodiment of the computer readable medium 500 of FIG. 11, the computer readable medium 500 may comprise transitory or non-transitory data 510 representing a MPEG-DASH status message as described elsewhere.

Figure 12:
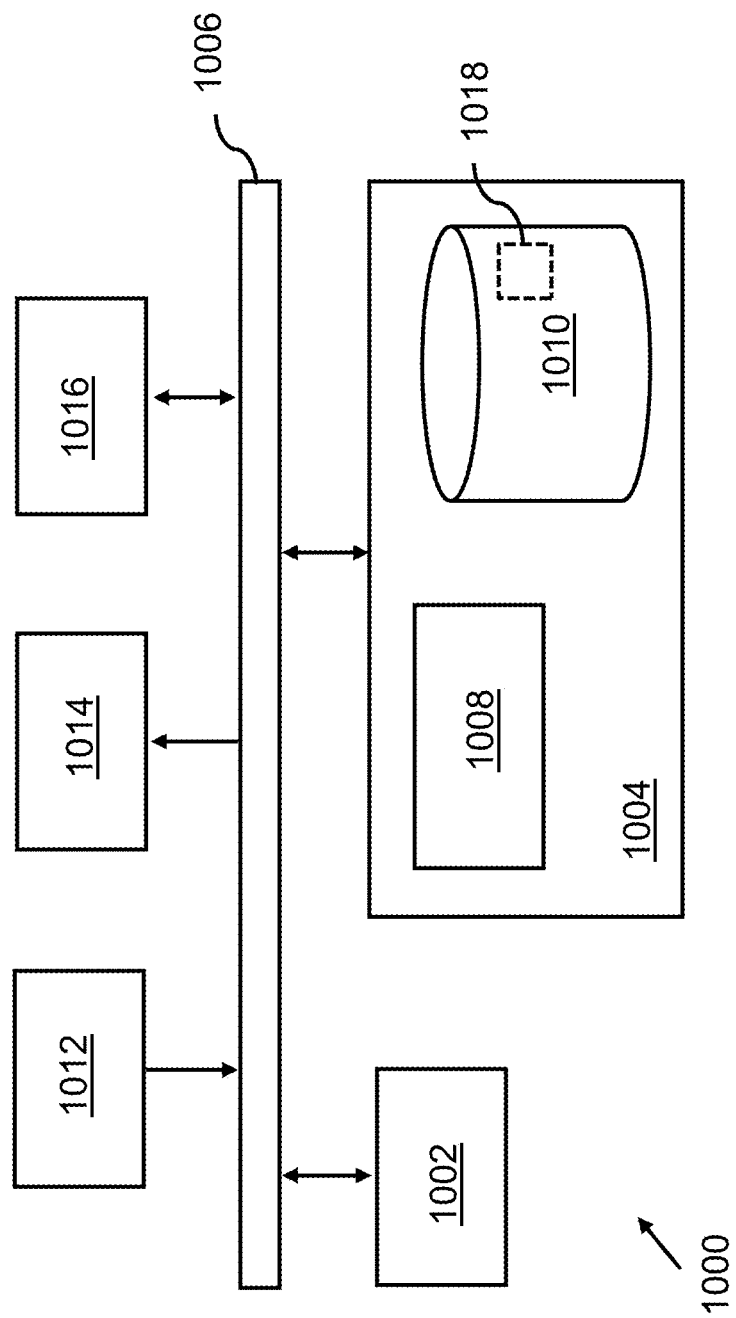
FIG. 12 shows an exemplary data processing system.

FIG. 12 is a block diagram illustrating an exemplary data processing system 1000 that may be used in the embodiments described in this specification. Such data processing systems include data processing entities described in this specification, including but not limited to the client or the client device or the edge computing server as described with reference to FIGS. 1-9 and elsewhere, or the system of FIG. 10.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 12, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a client or a client device or an edge computing server as described with reference to FIGS. 1 to 9. In that case, application 1018 may represent an application that, when executed, configures data processing system 1000 to perform the functions described with reference to said entity. In another example, data processing system 1000 may represent a system as described with reference to FIG. 10. In that case, application 1018 may represent an application that, when executed, configures data processing system 1000 to perform the functions described with reference to said entity.

In accordance with an abstract of the present specification, a system and method may be provided for rendering a video stream for display on a display device, which may comprise receiving the video stream by streaming and generating display data defining a visible display area to be displayed by the display device, wherein said generating of the display data comprises rendering the video stream in a sub-area of the visible display area. A selection mechanism may be provided by which a version of the video stream may be selected for streaming having a spatial resolution and/or a bitrate which is selected based on a size of the sub-area. Thereby, the video stream may be adapted in terms of visual quality to the effective spatial resolution provided by the sub-area. In particular, for a smaller sub-area, it may be avoided to stream a version of the video stream which contains spatial detail which cannot be perceived when the video stream is rendered in the sub-area but which may incur more technical cost, e.g., in terms of required network bandwidth, decoding capabilities and decoding resource allocation, etc., than a video stream which has a lower resolution and/or lower bitrate and is thereby adapted to the size of the sub-area.

In the claims, any reference signs placed between parentheses shall not be construed as limiting the claim. Use of the verb "comprise" and its conjugations does not exclude the presence of elements or steps other than those stated in a claim. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for rendering a video stream for display on a display device, comprising:
    a network interface for receiving the video stream by streaming;
    a processor subsystem configured to:
        generate display data defining a visible display area to be displayed by the display device by rendering a virtual environment from a viewing position in the virtual environment, wherein said generating of the display data comprises rendering the video stream on a virtual display in the virtual environment by rendering the video stream in a sub-area of the visible display area; and
        select a version of the video stream for streaming in response to a change in a relative position and/or a relative orientation between the viewing position and the virtual display which results in a change in a size of the sub-area, the version of the video stream having a spatial resolution and/or a bitrate selected based on the size of the sub-area.

2. The system according to claim 1, wherein the video stream is streamed in a streaming session, and wherein the processor subsystem is configured to select the version of the video stream before or in a setup phase of the streaming session.

3. The system according to claim 1, wherein the virtual environment is
    a 3D environment.

4. The system according to claim 1, wherein the display device is configured to display the display data using an active display area having a display resolution, and wherein the processor subsystem is configured to:
    determine an equivalent display resolution for a part of the active display area with which the sub-area of the visible display area is to be displayed; and
    select the spatial resolution and/or the bitrate for streaming the video stream based on the equivalent display resolution.

5. The system according to claim 1, wherein the processor subsystem is configured to select the version of the video stream from a list, the list identifying versions of the video stream having different spatial resolutions and/or bitrates.

6. The system according to claim 4, wherein the processor subsystem is configured to select the version of the video stream having the spatial resolution which best matches the equivalent display resolution.

7. The system according to claim 1, wherein the processor subsystem is configured to request the version of the video stream by sending a message identifying a selected spatial resolution via the network interface to another entity.

8. The system according to claim 7, wherein the system is configured as a HAS (HTTP Adaptive Streaming) client and configured to send the message as a status message to a HAS streaming management system.

9. The system according to claim 1, wherein the system is one of a group of:
- a client device comprising or being the display device, or comprising a display interface to the display device; and
- an edge computing system configured to stream the display data to a client device which is connected to the display device.

10. A computer-implemented method for rendering a video stream on a display device, comprising:
- receiving the video stream by streaming;
- generating display data defining a visible display area to be displayed by the display device by rendering a virtual environment from a viewing position in the virtual environment, wherein said generating of the display data comprises rendering the video stream on a virtual display in the virtual environment in a sub-area of the visible display area;
the method further comprising:
- selecting a version of the video stream for streaming in response to a change in a relative position and/or a relative orientation between the viewing position and the virtual display which results in a change in a size of the sub-area, the version of the video stream having a spatial resolution and/or a bitrate selected based on the size of the sub-area.

11. A non-transitory computer-readable medium comprising a computer program, the computer program comprising instructions for causing a processor system to perform the method according to claim 10.

12. The computer-implemented method according to claim 10, wherein the virtual environment is a 3D environment.

13. The computer-implemented method according to claim 10, wherein the video stream is streamed in a streaming session, and wherein the method comprises selecting a first version of the video stream before or in a setup phase of the streaming session.

14. The computer-implemented method according to claim 10, wherein the display data is displayed using an active display area having a display resolution, and wherein the method comprises:
- determining an equivalent display resolution for a part of the active display area with which the sub-area of the visible display area is to be displayed; and
- selecting the spatial resolution and/or the bitrate for streaming the video stream based on the equivalent display resolution.

15. The computer-implemented method according to claim 10, wherein the selecting comprises selecting the version of the video stream from a list, the list identifying versions of the video stream having different spatial resolutions and/or bitrates.

16. The computer-implemented method according to claim 14, wherein the selecting comprises selecting the version of the video stream having the spatial resolution which best matches the equivalent display resolution.

17. The computer-implemented method according to claim 10, wherein the method comprises requesting the version of the video stream by sending a message identifying a selected spatial resolution via a network interface to another entity.

18. The computer-implemented method according to claim 17, wherein the method is implemented on a HAS (HTTP Adaptive Streaming) client, wherein the sending the message comprises sending the message as a status message to a HAS streaming management system.

19. A non-transitory computer-readable medium comprising a computer program, the computer program comprising instructions for causing a processor system to perform the method according to claim 12.

20. A non-transitory computer-readable medium comprising a computer program, the computer program comprising instructions for causing a processor system to perform the method according to claim 13.

21. A non-transitory computer-readable medium comprising a computer program, the computer program comprising instructions for causing a processor system to perform the method according to claim 14.

22. A non-transitory computer-readable medium comprising a computer program, the computer program comprising instructions for causing a processor system to perform the method according to claim 15.

23. A non-transitory computer-readable medium comprising a computer program, the computer program comprising instructions for causing a processor system to perform the method according to claim 16.

24. A non-transitory computer-readable medium comprising a computer program, the computer program comprising instructions for causing a processor system to perform the method according to claim 17.

25. A non-transitory computer-readable medium comprising a computer program, the computer program comprising instructions for causing a processor system to perform the method according to claim 18.

* * * * *